United States Patent
Fung et al.

(10) Patent No.: US 9,277,361 B2
(45) Date of Patent: Mar. 1, 2016

(54) METHODS AND SYSTEMS FOR CROSS-VALIDATING SENSOR DATA ACQUIRED USING SENSORS OF A MOBILE DEVICE

(71) Applicant: Google Inc., Mountain View, CA (US)

(72) Inventors: James Fung, Mountain View, CA (US); Joel Hesch, Mountain View, CA (US); Johnny Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/184,929

(22) Filed: Feb. 20, 2014

(65) Prior Publication Data

US 2015/0237479 A1 Aug. 20, 2015

(51) Int. Cl.
*H04W 4/02* (2009.01)
*G06T 7/20* (2006.01)

(52) U.S. Cl.
CPC .............. *H04W 4/026* (2013.01); *G06T 7/2033* (2013.01); *G06T 2207/10004* (2013.01); *G06T 2207/10028* (2013.01); *G06T 2207/30241* (2013.01)

(58) Field of Classification Search
CPC ....... H04N 5/145; H04N 7/014; H04N 19/55; H04W 4/02; H04W 4/026; G06T 7/20; G06T 7/2006; G06T 7/2033
See application file for complete search history.

(56) References Cited

U.S. PATENT DOCUMENTS

| | | | |
|---|---|---|---|
| 2003/0176970 A1 | 9/2003 | Ching-Fang | |
| 2004/0101047 A1* | 5/2004 | Yang | 375/240.08 |
| 2009/0248304 A1 | 10/2009 | Roumeliotis et al. | |
| 2011/0316980 A1 | 12/2011 | Dubbelman et al. | |
| 2012/0016623 A1* | 1/2012 | Hayner | 702/141 |
| 2014/0300732 A1 | 1/2014 | Friend et al. | |
| 2014/0341465 A1 | 11/2014 | Li et al. | |
| 2015/0043784 A1 | 2/2015 | Flint et al. | |

(Continued)

FOREIGN PATENT DOCUMENTS

| | | |
|---|---|---|
| KR | 10-0944934 | 3/2010 |
| KR | 10-1241171 | 3/2013 |
| KR | 10-2013-0141404 | 12/2013 |

OTHER PUBLICATIONS

Hesch, Joel A. and Stergios I. Roumeliotis, "A Direct Least-Squares (DLS) Method for PnP", ICCV '11 Proceedings of the 2011 International Conference on Computer Vision (ICCV), pp. 383-390, IEEE Computer Society, Washington, DC, USA, Nov. 6, 2011.
International Search Report and Written Opinion prepared by the Korean Patent Office in international patent application serial No. PCT/US2014/072467, Mar. 13, 2015.

(Continued)

*Primary Examiner* — Curtis Odom

(57) ABSTRACT

Methods and systems for cross-validating sensor data are described. An example method involves receiving image data and first timing information associated with the image data, and receiving sensor data and second timing information associated with the sensor data. The method further involves determining a first estimation of motion of the mobile device based on the image data and the first timing information, and determining a second estimation of the motion of the mobile device based on the sensor data and the second timing information. Additionally, the method involves determining whether the first estimation is within a threshold variance of the second estimation. The method then involves providing an output indicative of a validity of the first timing information and the second timing information based on whether the first estimation is within the threshold variance of the second estimation.

20 Claims, 14 Drawing Sheets

(56) References Cited

U.S. PATENT DOCUMENTS

| | | |
|---|---|---|
| 2015/0049955 A1 | 2/2015 | Stoeffler et al. |
| 2015/0185018 A1 | 7/2015 | Hesch |

OTHER PUBLICATIONS

Non-Final Office Action mailed Jun. 18, 2015 for U.S. Appl. No. 14/143,043, 21 pages.

* cited by examiner

1100

| Line / Row | |
|---|---|
| 0 - 15 | Sensor Data |
| 16 - 30 | Computer-Vision Data |
| 31 - 510 | First (Wide-Angle) Camera Data
640 x 480 |
| 511-690 | Depth Data
320 x 180 |
| 691 - 1170 | Second Camera Data
640 x 480 |

| LINE | | | | | | | | |
|---|---|---|---|---|---|---|---|---|
| 0 | PIXEL 0 (Y) | PIXEL 1 (Y) | PIXEL 2 (Y) | PIXEL 3 (Y) | PIXEL 4 (Y) | PIXEL 5 (Y) | ... | ... |
| 1 | ACCEL_X_H | ACCEL_X_L | ACCEL_Y_H | ACCEL_Y_L | ACCEL_Z_H | ACCEL_Z_L | ... | ... |
| 2 | GYRO_X_H | GYRO_X_L | GYRO_Y_H | GYRO_Y_L | GYRO_Z_H | GYRO_Z_L | ... | ... |
| 3 | MAG_X_H | MAG_X_L | MAG_Y_H | MAG_Y_L | MAG_Z_H | MAG_Z_L | ... | ... |
| 4 | BARO_B3 | BARO_B2 | BARO_B1 | BARO_B0 | | | ... | ... |
| 5 | TEMP_I_H | TEMP_I_L | TEMP_F_H | TEMP_F_L | | | ... | ... |
| ... | TIMESTAMP_B3 | TIMESTAMP_B2 | TIMESTAMP_B1 | TIMESTAMP_B0 | | | ... | ... |
| 16 | ... | ... | ... | ... | ... | ... | ... | ... |
| ... | FEATURE1_B3 | FEATURE1_B2 | FEATURE1_B1 | FEATURE1_B0 | FEATURE2_B1 | FEATURE2_B0 | ... | ... |
| | ... | ... | ... | ... | ... | ... | ... | ... |

Columns 1–6 (PIXEL 0 through PIXEL 5): SENSOR DATA
Columns 7–8: COMPUTER-VISION DATA

Computer Program Product 1300

Signal Bearing Medium 1301

Program Instructions 1302

- receive image data and first timing information associated with the image data, wherein the image data includes images representative of a motion of a mobile device and is determined using a first sensor of a plurality of sensors of the mobile device;

- receive sensor data and second timing information associated with the sensor data, wherein the sensor data corresponds to the motion of the mobile device and is determined using a second sensor of the plurality of sensors;

- determine a first estimation of the motion of the mobile device based on the image data and the first timing information;

- determine a second estimation of the motion of the mobile device based on the sensor data and the second timing information;

- determine whether the first estimation of the motion of the mobile device is within a threshold variance of the second estimation of the motion of the mobile device; and

- based on whether the first estimation of the motion of the mobile device is within the threshold variance of the second estimation of the motion of the mobile device, provide an output indicative of a validity of the first timing information and the second timing information.

| Computer Readable Medium 1303 | Computer Recordable Medium 1304 | Communications Medium 1305 |

FIGURE 13

METHODS AND SYSTEMS FOR CROSS-VALIDATING SENSOR DATA ACQUIRED USING SENSORS OF A MOBILE DEVICE

BACKGROUND

In addition to having advanced computing and connectivity capabilities to facilitate high-speed data communication, many modern mobile devices include a variety of sensors. For example, mobile devices, such as smartphones, tablets, and wearable computing devices, are often equipped with sensors for imaging and positioning. A few examples of sensors that may be found in a mobile device include accelerometers, gyroscopes, magnetometers, barometers, global positioning system (GPS) receivers, microphones, cameras, Wi-Fi sensors, Bluetooth sensors, temperature sensors, and pressure sensors, among other types of sensors.

The wide variety of available sensors enables mobile devices to perform various functions and provide various user experiences. As one example, a mobile device may use imaging and/or positioning data to determine a trajectory of the mobile device as a user moves the mobile device through an environment. As another example, a mobile device may use imaging and/or positioning data to generate a 2D or 3D map of an environment, or determine a location of a mobile device within a 2D or 3D map of an environment. As a further example, a mobile device may use imaging and/or positioning data to facilitate augmented reality applications. Other examples also exist.

SUMMARY

In examples in which a mobile device relies on data from two or more sensors to perform a particular function (e.g., trajectory determination, odometry, map generation, etc.), it can be advantageous to be able to validate data from the sensors and/or detect errors in the data. For example, it may be useful to be able to determine whether image data or sensor data is accurately being timestamped. Described herein are methods and systems for correlating sensor data in different ways in order to validate the data. For instance, example methods involve comparing data corresponding to a first sensor with data corresponding to a second sensor to determine whether timestamps associated with the data from the first sensor and second sensor are accurate.

In one example aspect, a method performed by a mobile device having a plurality of sensors is provided. The method involves receiving image data and first timing information associated with the image data. The image data includes images representative of a motion of the mobile device and is determined using a first sensor of the plurality of sensors. The method also involves receiving sensor data and second timing information associated with the sensor data. The sensor data corresponds to the motion of the mobile device and is determined using a second sensor of the plurality of sensors. The method further involves determining a first estimation of the motion of the mobile device based on the image data and the first timing information, and determining a second estimation of the motion of the mobile device based on the sensor data and the second timing information. Additionally, the method involves determining whether the first estimation of the motion of the mobile device is within a threshold variance of the second estimation of the motion of the mobile device. The method then involves providing an output indicative of a validity of the first timing information and the second timing information based on whether the first estimation of the motion of the mobile device is within the threshold variance of the second estimation of the motion of the mobile device.

In another example aspect, a mobile device is provided. The mobile device includes at least one camera, at least one sensor, and a processor. The processor is configured to receive image data and first timing information associated with the image data. The image data includes images representative of a motion of the mobile device and is determined using the at least one camera. The processor is also configured to receive sensor data and second timing information associated with the sensor data. The sensor data corresponds to the motion of the mobile device and is determined using the at least one sensor. The processor is further configured to determine a first estimation of the motion of the mobile device based on the image data and the first timing information, and determine a second estimation of the motion of the mobile device based on the sensor data and the second timing information. Additionally, the processor is configured to determine whether the first estimation of the motion of the mobile device is within a threshold variance of the second estimation of the motion of the mobile device. The processor is then configured to provide an output indicative of a validity of the first timing information and the second timing information based on whether the first estimation of the motion of the mobile device is within the threshold variance of the second estimation of the motion of the mobile device.

In still another example aspect, a non-transitory computer readable medium that, when executed by one or more processors, causes the one or more processors to perform functions is provided. The functions include receiving image data and first timing information associated with the image data. The image data includes images representative of a motion of a mobile device and is determined using a first sensor of a plurality of sensors of the mobile device. The functions also include receiving sensor data and second timing information associated with the sensor data. The sensor data corresponds to the motion of the mobile device and is determined using a second sensor of the plurality of sensors. The functions further include determining a first estimation of the motion of the mobile device based on the image data and the first timing information, and determining a second estimation of the motion of the mobile device based on the sensor data and the second timing information. Additionally, the functions include determining whether the first estimation of the motion of the mobile device is within a threshold variance of the second estimation of the motion of the mobile device. And the functions include providing an output indicative of a validity of the first timing information and the second timing information based on whether the first estimation of the motion of the mobile device is within the threshold variance of the second estimation of the motion of the mobile device.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 11 is a conceptual illustration of an example digital image format.

FIG. 12 is a conceptual illustration of example sensor data formats.

FIG. 13 is schematic illustrating a conceptual partial view of an example computer program product that includes a computer program for executing a computer process on a computing device.

DETAILED DESCRIPTION

Figure 1:
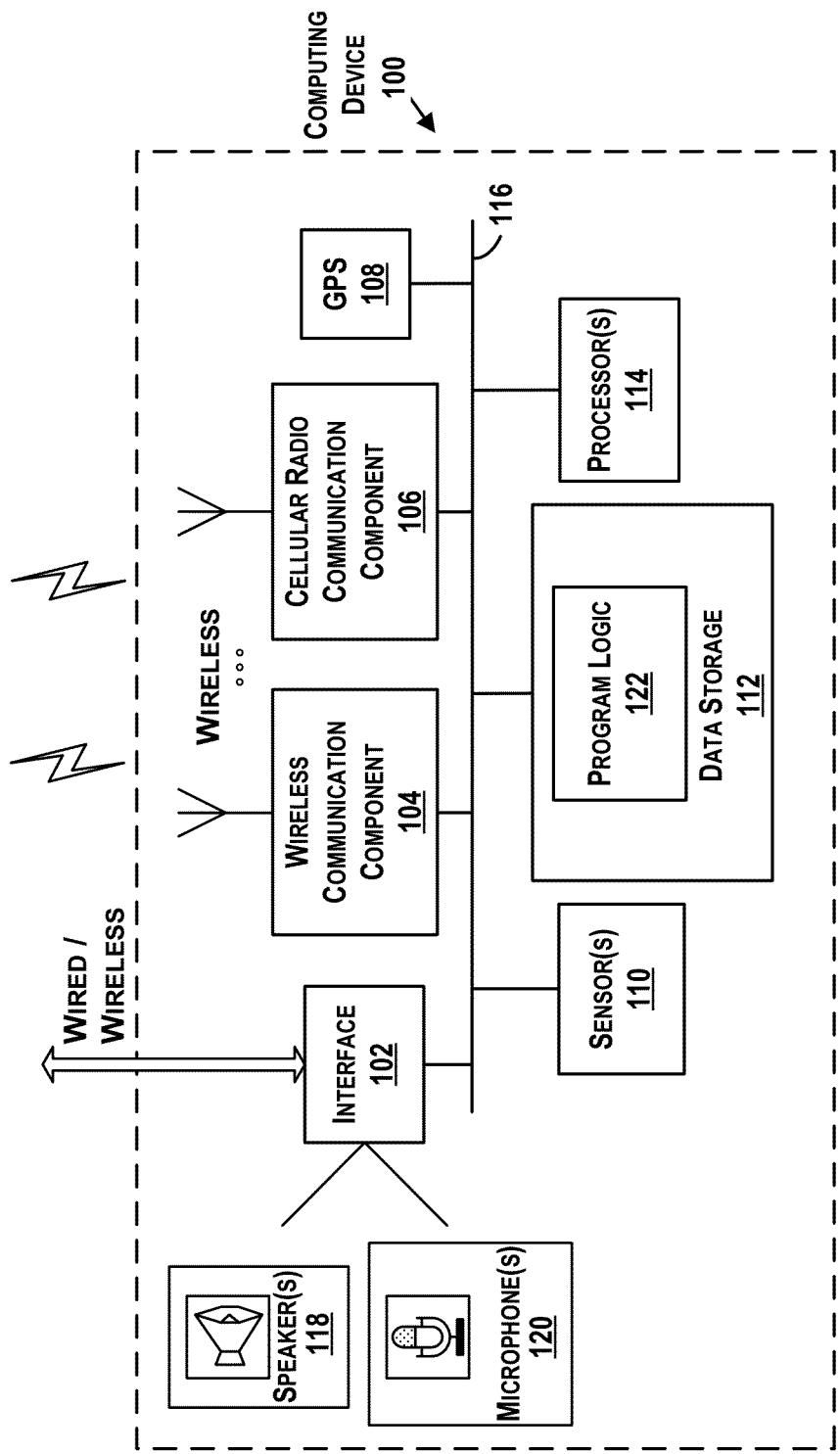
FIG. 1 illustrates an example computing device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Within examples, sensor data from two or more sensors of a mobile device may be cross-correlated in order to validate the data or look for errors in the data. By way of example, data from a first sensor of the mobile device may be compared with data from a second sensor of the mobile device to validate timestamps that were associated with the sensor data by the mobile device. In some instances, information derived from images captured using a camera of the mobile device, which have been timestamped by the mobile device, may be compared within information derived from accelerometer readings output by a gyroscope of mobile device, which have also been timestamped by the mobile device. Based on whether the information derived from the images is within a threshold variance of the information derived from the gyroscope, a computing device, such as the mobile device, may provide an output indicative of a validity of the timestamps associated with the images and the accelerometer readings. For example, the output may indicate that timestamps associated with the images and the accelerometer readings are accurate. Alternatively, the output may indicate that timestamps associated with the images or the accelerometer readings appear to be corrupted.

Various examples of the type of information that may be derived from the images and the accelerometer readings for comparison are described hereinafter. In some examples, a computing device may be able to determine an accuracy of intrinsic and/or extrinsic parameters of a camera of the mobile device based on the comparison. The computing device may then provide an additional output that is indicative of the accuracy of the parameters of the camera of the mobile device.

In other examples, information derived from other types of sensors of the mobile device may be compared to validate the data or look for errors in the data. As one example, information derived from two separate cameras of the mobile device may be compared. As another example, information derived from depth images may be compared with information derived from two-dimensional images captured using the mobile device. As still another example, information derived from outputs of a barometer may be compared with information derived from depth images obtained using the mobile device. In yet another example, information derived from images captured using the mobile device may be compared with information derived acquired using a light sensor of the mobile device.

Additional example methods as well as example devices (e.g., mobile or otherwise) are described hereinafter with reference to the accompanying figures.

Referring now to the figures, FIG. 1 illustrates an example computing device 100. In some examples, components illustrated in FIG. 1 may be distributed across multiple computing devices. However, for the sake of example, the components are shown and described as part of one example computing device 100. The computing device 100 may be or include a mobile device (such as a mobile phone), desktop computer, laptop computer, email/messaging device, tablet computer, or similar device that may be configured to perform the functions described herein. Generally, the computing device 100 may be any type of computing device or transmitter that is configured to transmit data or receive data in accordance with methods and functions described herein.

The computing device 100 may include an interface 102, a wireless communication component 104, a cellular radio communication component 106, a global positioning system (GPS) receiver 108, sensor(s) 110, data storage 112, and processor(s) 114. Components illustrated in FIG. 1 may be linked together by a communication link 116. The computing device 100 may also include hardware to enable communication within the computing device 100 and between the computing device 100 and other computing devices (not shown), such as a server entity. The hardware may include transmitters, receivers, and antennas, for example.

The interface 102 may be configured to allow the computing device 100 to communicate with other computing devices (not shown), such as a server. Thus, the interface 102 may be configured to receive input data from one or more computing devices, and may also be configured to send output data to the one or more computing devices. The interface 102 may be configured to function according to a wired or wireless communication protocol. In some examples, the interface 102 may include buttons, a keyboard, a touchscreen, speaker(s) 118, microphone(s) 120, and/or any other elements for receiving inputs, as well as one or more displays, and/or any other elements for communicating outputs.

The wireless communication component 104 may be a communication interface that is configured to facilitate wireless data communication for the computing device 100 according to one or more wireless communication standards. For example, the wireless communication component 104 may include a Wi-Fi communication component that is configured to facilitate wireless data communication according to one or more IEEE 802.11 standards. As another example, the wireless communication component 104 may include a Bluetooth communication component that is configured to facilitate wireless data communication according to one or more Bluetooth standards. Other examples are also possible.

The cellular radio communication component 106 may be a communication interface that is configured to facilitate wireless communication (voice and/or data) with a cellular wireless base station to provide mobile connectivity to a network. The cellular radio communication component 106 may be configured to connect to a base station of a cell in which the computing device 100 is located, for example.

The GPS receiver 108 may be configured to estimate a location of the computing device 100 by precisely timing signals sent by GPS satellites.

The sensor(s) 110 may include one or more sensors, or may represent one or more sensors included within the computing device 100. Example sensors include an accelerometer, gyroscope, pedometer, light sensor, microphone, camera(s), infrared flash, barometer, magnetometer, Wi-Fi, near field communication (NFC), Bluetooth, projector, depth sensor, temperature sensor, or other location and/or context-aware sensors.

The data storage 112 may store program logic 122 that can be accessed and executed by the processor(s) 114. The data storage 112 may also store data collected by the sensor(s) 110, or data collected by any of the wireless communication component 104, the cellular radio communication component 106, and the GPS receiver 108.

The processor(s) 114 may be configured to receive data collected by any of sensor(s) 110 and perform any number of functions based on the data. As an example, the processor(s) 114 may be configured to determine one or more geographical location estimates of the computing device 100 using one or more location-determination components, such as the wireless communication component 104, the cellular radio communication component 106, or the GPS receiver 108. The processor(s) 114 may use a location-determination algorithm to determine a location of the computing device 100 based on a presence and/or location of one or more known wireless access points within a wireless range of the computing device 100. In one example, the wireless location component 104 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the computing device 100 may be determined.

In another instance, the processor(s) 114 may use a location-determination algorithm to determine a location of the computing device 100 based on nearby cellular base stations. For example, the cellular radio communication component 106 may be configured to identify a cell from which the computing device 100 is receiving, or last received, signal from a cellular network. The cellular radio communication component 106 may also be configured to measure a round trip time (RTT) to a base station providing the signal, and combine this information with the identified cell to determine a location estimate. In another example, the cellular communication component 106 may be configured to use observed time difference of arrival (OTDOA) from three or more base stations to estimate the location of the computing device 100.

In some implementations, the computing device 100 may include a device platform (not shown), which may be configured as a multi-layered Linux platform. The device platform may include different applications and an application framework, as well as various kernels, libraries, and runtime entities. In other examples, other formats or operating systems may operate the computing g device 100 as well.

The communication link 116 is illustrated as a wired connection; however, wireless connections may also be used. For example, the communication link 116 may be a wired serial bus such as a universal serial bus or a parallel bus, or a wireless connection using, e.g., short-range wireless radio technology, or communication protocols described in IEEE 802.11 (including any IEEE 802.11 revisions), among other possibilities.

The computing device 100 may include more or fewer components. Further, example methods described herein may be performed individually by components of the computing device 100, or in combination by one or all of the components of the computing device 100.

Figure 2:
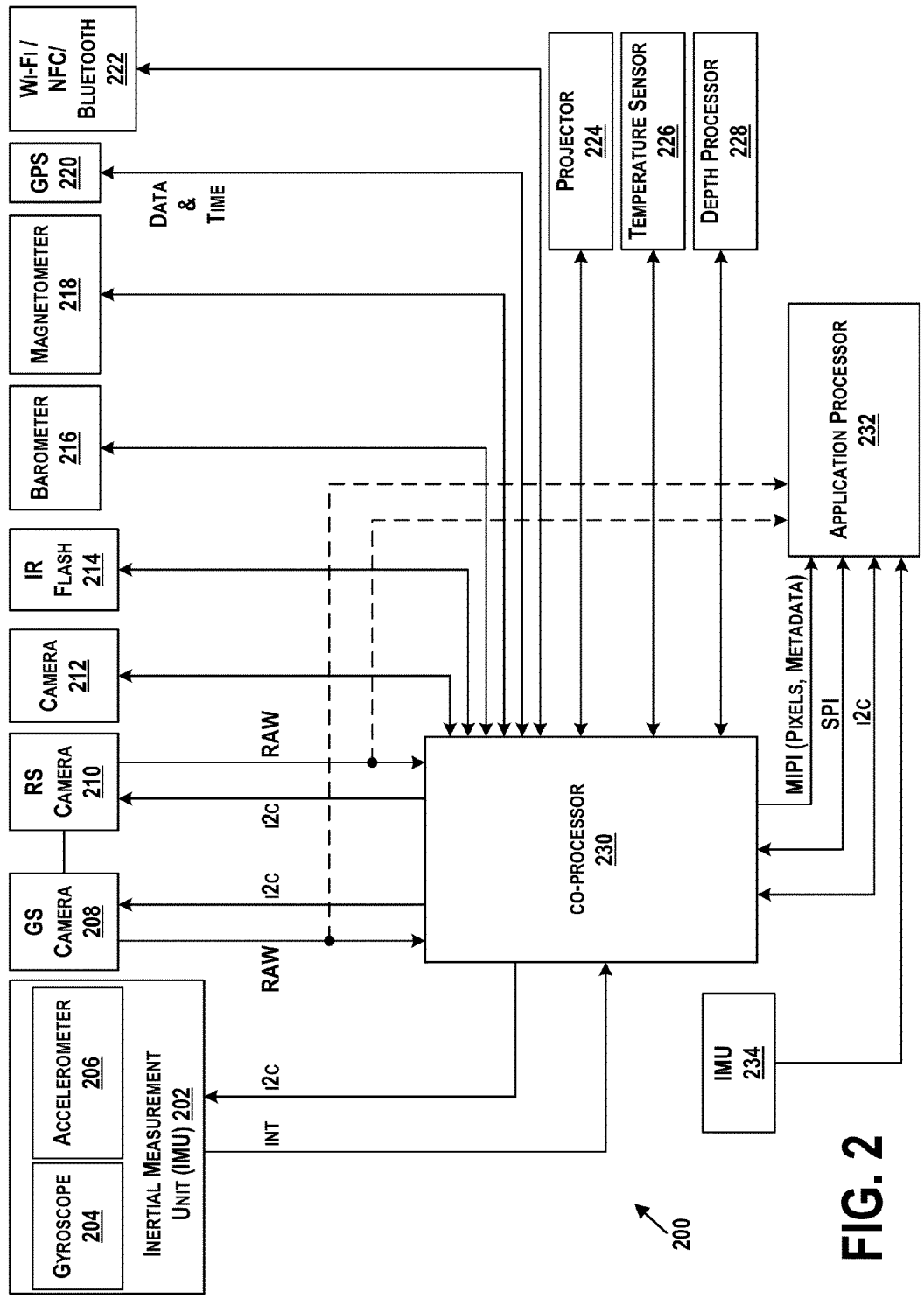
FIG. 2 illustrates another example computing device.

FIG. 2 illustrates another example computing device 200. The computing device 200 in FIG. 2 may be representative of a portion of the computing device 100 shown in FIG. 1. In FIG. 2, the computing device 200 is shown to include a number of sensors such as an inertial measurement unit (IMU) 202 including a gyroscope 204 and an accelerometer 206, a global shutter (GS) camera 208, a rolling shutter (RS) camera 210, a front facing camera 212, an infrared (IR) flash 214, a barometer 216, a magnetometer 218, a GPS receiver 220, a Wi-Fi/NFC/Bluetooth sensor 222, a projector 224, and a temperature sensor 226, each of which outputs to a co-processor 230. Additionally, the computing device 200 is shown to include a depth processor 228 that receives input from and outputs to the co-processor 230. And the co-processor 230 receives input from and outputs to an application processor 232. The computing device 200 may further include a second IMU 234 that outputs directly to the application processor 232.

The IMU 202 may be configured to determine a velocity, orientation, and gravitational forces of the computing device 200 based on outputs of the gyroscope 204 and the accelerometer 206.

The GS camera 208 may be configured on the computing device 200 to be a rear facing camera, so as to face away from a front of the computing device 200. The GS camera 208 may be configured to read outputs of all pixels of the camera 208 simultaneously. The GS camera 208 may be configured to have about a 120-170 degree field of view, such as a fish eye sensor, for wide-angle viewing.

The RS camera 210 may be configured to read outputs of pixels from a top of the pixel display to a bottom of the pixel display. As one example, the RS camera 210 may be a red/green/blue (RGB) infrared (IR) 4 megapixel image sensor, although other sensors are possible as well. The RS camera 210 may have a fast exposure so as to operate with a minimum readout time of about 5.5 ms, for example. Like the GS camera 208, the RS camera 210 may be a rear facing camera.

The camera 212 may be an additional camera in the computing device 200 that is configured as a front facing camera, or in a direction facing opposite of the GS camera 208 and the RS camera 210. The camera 212 may be a wide angle camera, and may have about a 120-170 degree field of view for wide angle viewing, for example.

The IR flash 214 may provide a light source for the computing device 200, and may be configured to output light in a direction toward a rear of the computing device 200 so as to provide light for the GS camera 208 and RS camera 210, for example. In some examples, the IR flash 214 may be configured to flash at a low duty cycle, such as 5 Hz, or in a non-continuous manner as directed by the co-processor 230 or application processor 232. The IR flash 214 may include an LED light source configured for use in mobile devices, for example.

Figure 3A:
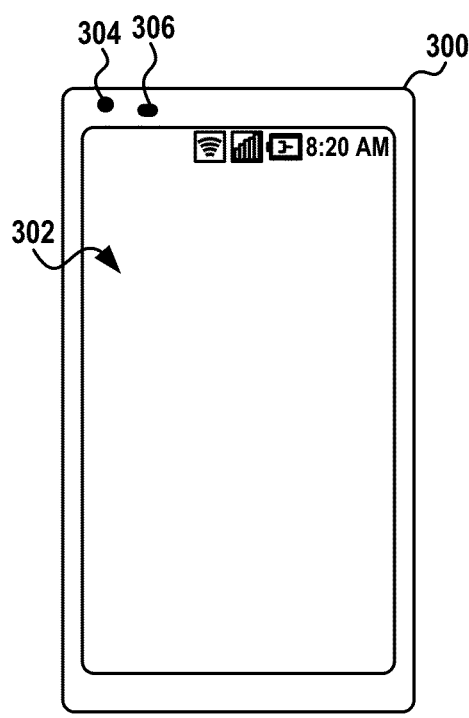
FIGS. 3A-3B are conceptual illustrations of an example computing device.
Figure 3B:
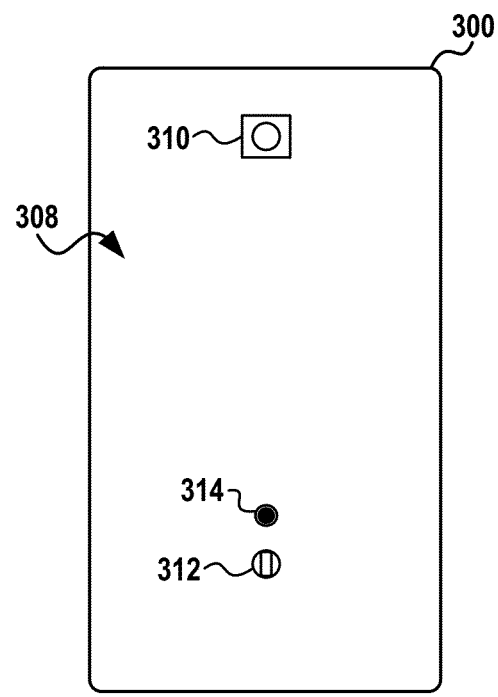

FIGS. 3A-3B are conceptual illustrations of a computing device 300 that show a configuration of some of the sensors on the computing device 300. In FIGS. 3A-3B, the computing device 300 is shown as a mobile phone. The computing device 300 may be similar to either of computing device 100 in FIG. 1 or computing device 200 in FIG. 2. FIG. 3A illustrates a front of the computing device 300 in which a display 302 is provided, along with a front facing camera 304, and a P/L sensor opening 306 (e.g., a proximity or light sensor). The front facing camera 304 may be the camera 212 as described in FIG. 2.

FIG. 3B illustrates a back 308 of the computing device 300 in which a rear camera 310 and another rear camera 314 are provided. The rear camera 310 may be the RS camera 210 and the rear camera 312 may be the GS camera 208, as described in the computing device 200 in FIG. 2. The back 308 of the computing device 300 also includes an IR flash 314, which may be the IR flash 214 or the projector 224 as described in the computing device 200 in FIG. 2. In one example, the IR flash 214 and the projector 224 may be one in the same. For instance, a single IR flash may be used to perform the functions of the IR flash 214 and the projector 224. In another example, the computing device 300 may include a second flash (e.g., an LED flash) located near the rear camera 310 (not shown). A configuration and placement of the sensors may be helpful to provide desired functionality of the computing device 300, for example, however other configurations are possible as well.

Referring back to FIG. 2, the barometer 216 may include a pressure sensor, and may be configured to determine air pressures and altitude changes.

The magnetometer 218 may be configured to provide roll, yaw, and pitch measurements of the computing device 200, and can be configured to operate as an internal compass, for example. In some examples, the magnetometer 218 may be a component of the IMU 202 (not shown).

The GPS receiver 220 may be similar to the GPS receiver 108 described in the computing device 100 of FIG. 1. In further examples, the GPS 220 may also output timing signals as received from GPS satellites or other network entities. Such timing signals may be used to synchronize collected data from sensors across multiple devices that include the same satellite timestamps.

The Wi-Fi/NFC/Bluetooth sensor 222 may include wireless communication components configured to operate according to Wi-Fi and Bluetooth standards, as discussed above with the computing device 100 of FIG. 1, and according to NFC standards to establish wireless communication with another device via contact or coming into close proximity with the other device.

The projector 224 may be or include a structured light projector that has a laser with a pattern generator to produce a dot pattern in an environment. The projector 224 may be configured to operate in conjunction with the RS camera 210 to recover information regarding depth of objects in the environment, such as three-dimensional (3D) characteristics of the objects. For example, the RS camera 210 may be an RGB-IR camera that is configured to capture one or more images of the dot pattern and provide image data to the depth processor 228. The depth processor 228 may then be configured to determine distances to and shapes of objects based on the projected dot pattern. By way of example, the depth processor 228 may be configured to cause the projector 224 to produce a dot pattern and cause the RS camera 210 to capture an image of the dot pattern. The depth processor may then process the image of the dot pattern, use various algorithms to triangulate and extract 3D data, and output a depth image to the co-processor 230.

The temperature sensor 226 may be configured to measure a temperature or temperature gradient, such as a change in temperature, for example, of an ambient environment of the computing device 200.

The co-processor 230 may be configured to control all sensors on the computing device 200. In examples, the co-processor 230 may control exposure times of any of cameras 208, 210, and 212 to match the IR flash 214, control the projector 224 pulse sync, duration, and intensity, and in general, control data capture or collection times of the sensors. The co-processor 230 may also be configured to process data from any of the sensors into an appropriate format for the application processor 232. In some examples, the co-processor 230 merges all data from any of the sensors that corresponds to a same timestamp or data collection time (or time period) into a single data structure to be provided to the application processor 232. The co-processor 230 may also be configured to perform other functions, as described below.

The application processor 232 may be configured to control other functionality of the computing device 200, such as to control the computing device 200 to operate according to an operating system or any number of software applications stored on the computing device 200. The application processor 232 may use the data collected by the sensors and received from the co-processor to perform any number of types of functionality. The application processor 232 may receive outputs of the co-processor 230, and in some examples, the application processor 232 may receive raw data outputs from other sensors as well, including the GS camera 208 and the RS camera 210. The application processor 232 may also be configured to perform other functions, as described below.

The second IMU 234 may output collected data directly to the application processor 232, which may be received by the application processor 232 and used to trigger other sensors to begin collecting data. As an example, outputs of the second IMU 234 may be indicative of motion of the computing device 200, and when the computing device 200 is in motion, it may be desired to collect image data, GPS data, etc. Thus, the application processor 232 can trigger other sensors through communication signaling on common buses to collect data at the times at which the outputs of the IMU 234 indicate motion.

The computing device 200 shown in FIG. 2 may include a number of communication buses between each of the sensors and processors. For example, the co-processor 230 may communicate with each of the IMU 202, the GS camera 208, and the RS camera 212 over an inter-integrated circuit (I2C) bus that includes a multi-master serial single-ended bus for communication. The co-processor 230 may receive raw data collected, measured, or detected by each of the IMU 202, the GS camera 208, and the RS camera 212 over the same I2C bus or a separate communication bus. The co-processor 230 may communicate with the application processor 232 over a number of communication buses including a serial peripheral interface (SPI) bus that includes a synchronous serial data link that may operate in full duplex mode, the I2C bus, and a mobile industry processor interface (MIPI) that includes a serial interface configured for communicating camera or pixel information. Use of various buses may be determined based on need of speed of communication of data as well as bandwidth provided by the respective communication bus, for example.

Figure 4:
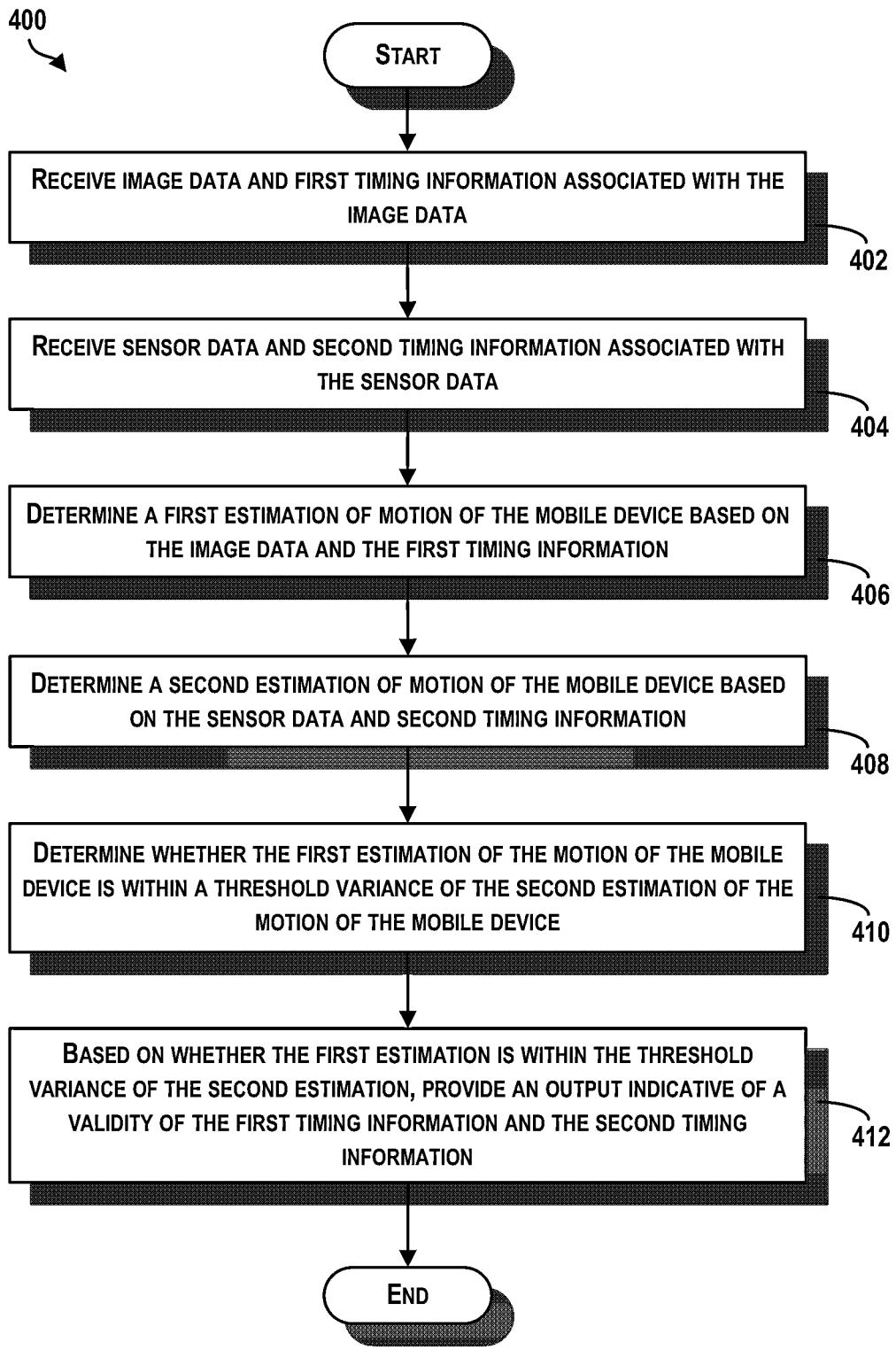
FIG. 4 is a block diagram of an example method for cross-validating sensor data acquired using sensors of a mobile device.

FIG. 4 is a block diagram of an example method 400 for cross-validating sensor data acquired using sensors of a mobile device. Method 400 shown in FIG. 4 presents an embodiment of a method that could be used or implemented by the computing device 100 of FIG. 1 or the computing device 200 of FIG. 2, for example, or more generally by one or more components of any computing device. Method 400 may include one or more operations, functions, or actions as illustrated by one or more of blocks 402-406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 400 and other processes and methods disclosed herein, each block in FIG. 4 may represent circuitry that is wired to perform the specific logical functions in the process.

Functions of the method 400 may be fully performed by a computing device, or may be distributed across multiple computing devices and/or servers. As one example, the method 400 may be performed by a device that has an application processor configured to function based on an operating system and a co-processor configured to receive data from a plurality of sensors of the device. The sensors may include any sensors as described above in any of FIG. 1, FIG. 2, or FIGS. 3A-3B, for example, including an IMU, a global shutter camera, a rolling shutter camera, a structured light projector, a depth camera, an infrared flash, a barometer, a magnetometer, and a temperature sensor. It is contemplated that the sensors may include other types of sensors as well.

In some embodiments, functions of the method 400 may be performed by the application processor 232 of FIG. 2. In other embodiments, functions of the method 400 may be performed by the co-processor 230 of FIG. 2. In still other embodiments, functions of the method 400 may be performed by a computing device in a server that is located remotely from the mobile device.

Initially, at block 402, the method 400 includes receiving image data and first timing information associated with the image data. In some examples, the image data may include images representative of a motion of the mobile device. For instance, the images may be two-dimensional or three-dimensional images captured using a camera or depth processor of the mobile device. Within examples, the image data may be received from a camera of the mobile device, or received from the co-processor of the mobile device.

The images representative of the motion of the mobile device may have been captured while a position and/or orientation of the mobile device is manipulated. For example, the images may have been captured while a user rotates the mobile device or varies the position of the mobile device.

In one embodiment, the images may be a sequence of images, such as three, five, ten, or another number of images captured in sequence. The timing information associated with the image data may include timestamps associated with each image. In some examples, the timestamps may have been determined by a co-processor of the mobile device. For instance, the co-processor may be configured to generate a timestamp upon receiving an interrupt from a camera of the mobile device. The co-processor may then associate the generated timestamp with image data that is subsequently output by the camera. Alternatively, the co-processor may provide the timestamp to an application processor that is configured to associate the timestamp with image data that is received from the camera by the application processor.

The timing information may be determined using other techniques as well. For example, in one instance, the co-processor of the mobile device may trigger the camera to capture an image and generate a timestamp indicating when a trigger was provided to the camera. Upon receiving image data, the co-processor may then associate the generated timestamp with the image data. Furthermore, the co-processor may provide the image data and the timestamp information to the application processor.

At block 404, the method 400 includes receiving sensor data and second timing information associated with the sensor data. The sensor data may also correspond to the same motion of the mobile device described above. Additionally, the sensor data may have been determined using a sensor of the mobile device. Within examples, the sensor data may be received from the co-processor or received from the sensor of the mobile device.

In one instance, the sensor data may include accelerometer readings from a gyroscope, IMU, magnetometer, or accelerometer of the mobile device. In another instance, the sensor data may include images representative of the motion of the mobile device that were captured using a second camera of the mobile device. In still another instance, the sensor data may include a sequence of depth images determined using a depth processor of the mobile device. In yet another instance, the sensor data may include ambient light measurements provided by a light sensor of the mobile device.

The timing information may include timestamps associated with the sensor data. The timestamps may have been determined by a co-processor of the mobile device, for example. In an example in which the sensor data includes a sequence of images, the timing information may include timestamps associated with each respective image. Similarly, in an example in which the sensor data includes accelerometer readings, the timing information may include timestamps associated with each respective accelerometer reading.

Furthermore, because the timing information associated with the sensor data received at block 402 and the timing information associated with the sensor data received at block 404 may each be determined using a co-processor of the mobile device, the timestamps may correspond to the same timescale. That is to say, the sensor data received at block 402 may correspond to data having timestamps that are within a time range of T=0 seconds to T=0.5 seconds, and the sensor data received at block 404 may also correspond to data having timestamps that are within the same time range. Therefore, assuming the timestamps are accurate, the sensor data received at block 402 and the sensor data received at block 404 should both include data corresponding to the same motion of the mobile device.

At block 406, the method 400 includes determining a first estimation of motion of the mobile device based on the image data and the first timing information. In an example in which the image data includes a sequence of two-dimensional images, the estimation of motion of the mobile device may include an estimate of a rotational motion of the mobile device. Such an estimate of a rotational motion of the mobile device may be derived by identifying features in the images and tracking movement of the location of the features within each image throughout the sequence of images. For example, by tracking a single or multiple features over multiple image frames, and applying either the epipolar constraint or the homography constraint, the estimate of the rotational motion of the mobile device over time may be derived.

In another example, the estimation of the motion of the mobile device may include a trajectory of the mobile device time. For instance, if the mobile device is moved in front of a known object or target, a trajectory of the mobile device over time may be determined based on the observations of the known object or target. The trajectory may include one or any combination of position and orientation estimates of the mobile device over time within a frame of reference of the known object or target.

In one embodiment, the position and orientation may be solved for using a direct least-squares (DLS) method for computing the perspective-n-point camera pose determination problem (PnP). According to the DLS method, the nonlinear least-squares form of PnP may be modified to obtain a cost function which is a polynomial in only the parameters of orientation. Then derivatives of the cost function may be solved for to obtain a polynomial system of equations, in which the zeroes comprise the critical points of the original cost function. The Multiplication matrix for the polynomial system may be found by forming the Macaulay matrix. And based on the theory of Algebraic Geometry, all the solutions to the polynomial systems can be obtained via Eigen decomposition of the Multiplication matrix. Other approaches to determining the trajectory of the mobile device over time based on a sequence of images may also be employed.

Additional examples of information that may be derived from the image data are described below.

At block 408, the method 400 includes determining a second estimation of motion of the mobile device based on the sensor data and second timing information. As one example, the sensor data may include accelerometer readings, and the estimation of motion of the mobile device may be an estimate of the rotational motion of the mobile device over time. The estimate of the rotational motion of the mobile device may be determined by integrating the accelerometer readings, for example.

In an example in which the sensor data includes images, the rotational motion of the mobile device may be estimated using either of the techniques discussed above with reference to block 406. In an example in which the sensor data includes ambient light readings, the estimation of the motion of the mobile device may include an estimate of an illumination pattern of the mobile device over time. In an example in which the sensor data includes barometer readings, the estimation of the motion of the mobile device may include estimated changes in altitude of the mobile device over time, for instance.

Additional examples of information that may be derived from the sensor data are described below.

At block 410, the method 400 includes determining whether the first estimation of the motion of the mobile device is within a threshold variance of the second estimation of the motion of the mobile device. In an example in which the first estimation of the motion of the mobile device and the second estimation of the motion of the mobile device are estimates of rotational motions, magnitudes of each of the rotational motions may be compared over time. For instance, each magnitude may be a sinusoid. The two sinusoids may be correlated, and a time-offset (e.g., a phase difference) between the sinusoids may be calculated. Thus, a comparison can be made between the two sinusoids, and a threshold variance such as a phase difference of 4 ms may be used. Accordingly, if the time-offset between the two sinusoids is less than 4 ms, it may be determined that the first estimation is within a threshold variance of the second estimation. In other examples, the threshold variance may less than 4 ms (e.g., 0.5 ms, 1 ms, etc.) or larger than 4 ms (e.g., 5 ms, 10 ms, etc.).

In a further example, rotation vectors corresponding to each estimate of rotational motion may be compared. For instance, each rotation vector may be analyzed within a common reference frame to determine whether a difference in the magnitudes and/or directions of the rotation vectors is greater than a threshold amount at any point in time throughout the estimates of rotational motion.

By way of example, from image data, a first rotation estimate (e.g., 10 degrees about the x-axis) may be computed, given image-to-image point correspondences. A covariance of the rotation estimate may also be computed (e.g., +/−0.5 degrees of uncertainty on the rotation angle, and +/−1 degree of uncertainty on the axis or rotation). In a similar fashion, sensor data from a gyroscope may be used to compute a second rotation estimate over the same time interval as the image data. A corresponding uncertainty may also be derived from the gyroscope noise and bias stability characteristics. The first rotation estimate and the second rotation estimate may then be compared in a number of ways. For instance, an absolute difference between the first rotation estimate and the second rotation estimate can be found. The absolute difference may then be compared to a heuristic threshold (e.g., 1 degree). In another instance, the difference between the first rotation estimate and the second rotation estimate can be examined, weighted by the corresponding uncertainty in each estimate. This weighted difference may provide a probabilistic confidence value that is indicative of a level of agreement between a camera used to capture the image data and the gyroscope. Either comparison may be carried out by examining a full three-degrees-of-freedom rotation vectors of the first rotation estimate and the second rotation estimate, or by examining the magnitude of rotation of the first rotation estimate and the second rotation estimate.

In an example in which the first estimation of the motion of the mobile device and the second estimation of the mobile device are trajectories indicating the pose of the mobile device over time, the trajectories may be compared. For instance, the distance between the estimated positions of the mobile device as indicated by each of the trajectories may be compared over time to determine whether the distance between the estimated positions of the mobile device changes over time.

Other example comparisons are also contemplated, as described below.

And at block 412, the method 400 includes based on whether the first estimation is within the threshold variance of the second estimation, providing an output indicative of a validity of the first timing information and the second timing information. In one example, if is determined that a time-offset between the first estimation of the motion of the mobile device and the second estimation of the motion of the mobile device is greater than a threshold amount of time, the provided output may indicate that the timing information for the first sensor and/or the second sensor is invalid. If, however, the time-offset is less than the threshold amount of time, the output may confirm that the timing information associated with the image data and the sensor data is valid.

In another example, if a difference in the magnitudes of the rotational motions determined based on the image data and the sensor data is greater than a threshold amount, the provided output may indicate that one or more of the image data, sensor data, first timing information, and second timing information is invalid. In still another example, if a difference in the estimated positions of the mobile device, as determined based on the image data and the sensor data, changes over time, the provided output may indicate that one or more of the image data, sensor data, first timing information, and second timing information is invalid.

In further examples, if the method 400 is performed in a manufacturing facility as part of a calibration process, a notification may be provided to an operator in response to determining that the data may be invalid or corrupt. Alternatively, in an example in which the method 400 is performed on the mobile device while the mobile device is executing a mapping application, for example, in response to determining that the data may be invalid or corrupt, the mobile device may enter a correction mode. In the correction mode, the mobile device may provide a notification to a user, suggesting that the user repeat one or more operations or recalibrate the camera and the sensor. Alternatively, in the correction mode, the mobile device may disregard the image data or sensor data, and execute the mapping application using other available types of sensor data.

Figure 5:
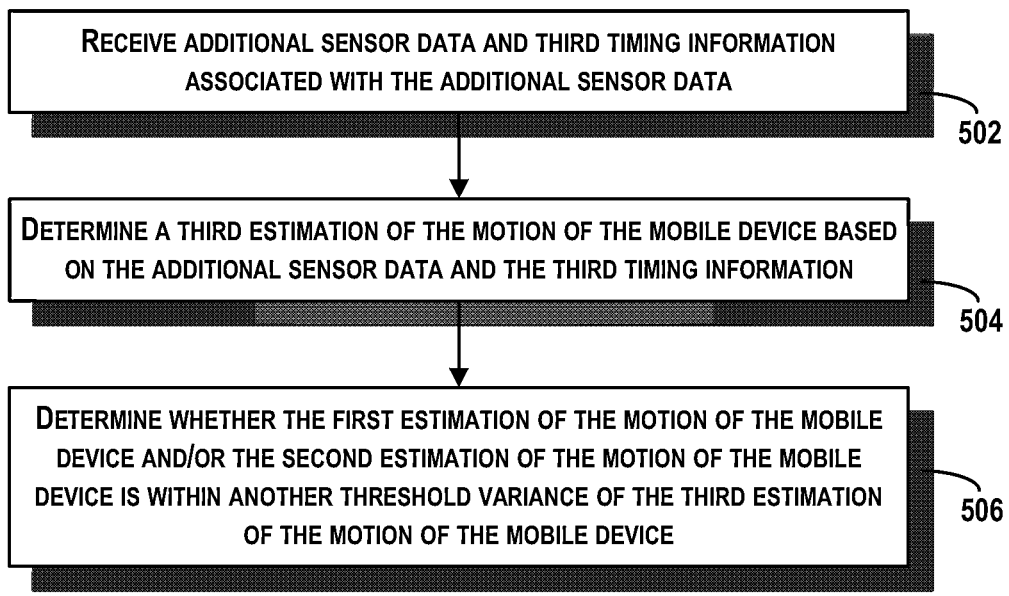
FIG. 5 is a block diagram of additional or optional functions that may be performed in conjunction with the example method of FIG. 4.

In some embodiments, multiple cross-validations of sensor data may be performed at once. By way of example, FIG. 5 is a block diagram of additional or optional functions that may be performed in conjunction with the example method of FIG. 4.

At block 502, the method 400 includes receiving additional sensor data and third timing information associated with the additional sensor data. The additional sensor data may include image data, accelerometer readings, ambient light readings, or any of the other types of sensor data acquired using the mobile device. Furthermore, the timing information may include timestamps associated with the sensor data by a co-processor of the mobile device, for example.

At block 504, the method 400 includes determining a third estimation of the motion of the mobile device based on the additional sensor data and the third timing information. The estimation of the mobile device may take any of a number of possible forms, such as an estimate of a rotational motion of the mobile device over time, an estimate of the trajectory of the mobile device over time, an estimate of changes in the altitude of the device over time, or an estimate of an illumination pattern over time.

And at block 506, the method 400 includes determining whether the first estimation of the motion of the mobile device and/or the second estimation of the motion of the mobile device is within another threshold variance of the third estimation of the motion of the mobile device. As one example, each of the first estimation, second estimation, and third estimation may include an estimate of the rotational motion of the mobile device over time. The magnitudes of the first estimation and the third estimation may then be correlated to determine a time-offset, and the magnitude of the second estimation and the third estimation may also be correlated to determine a time-offset. Both of the time-offsets may subsequently be compared to a threshold amount of time.

The output provided at block 412 may take into consideration not only the comparison performed at block 410, but also any of the comparisons performed at block 506. For instance, if either the comparison performed at block 410 or any of the comparisons performed at block 506 indicates that a time-offset is greater than a time-offset threshold, which may be on the order of milliseconds, or in a range of 0.1 to 0.5 seconds, the output may indicate that the image data, sensor data, or timing information may be invalid. Therefore, the cross-validation of data may involve comparing image data and sensor data from more than two sensors of the mobile device.

Figure 6A:
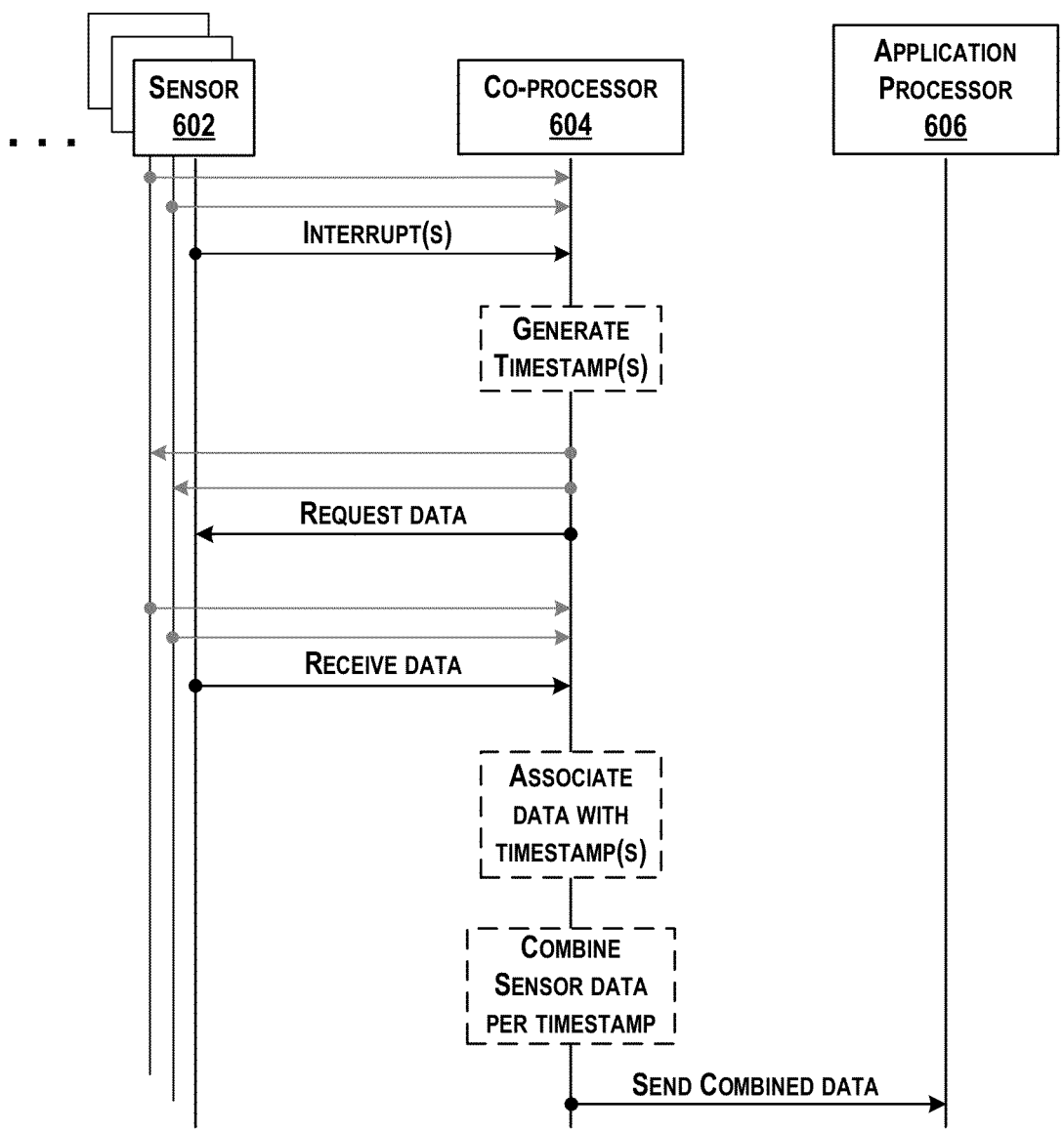
FIG. 6A is an example timing diagram conceptually illustrating synchronizing data received from multiple sensors of a device.
Figure 6B:
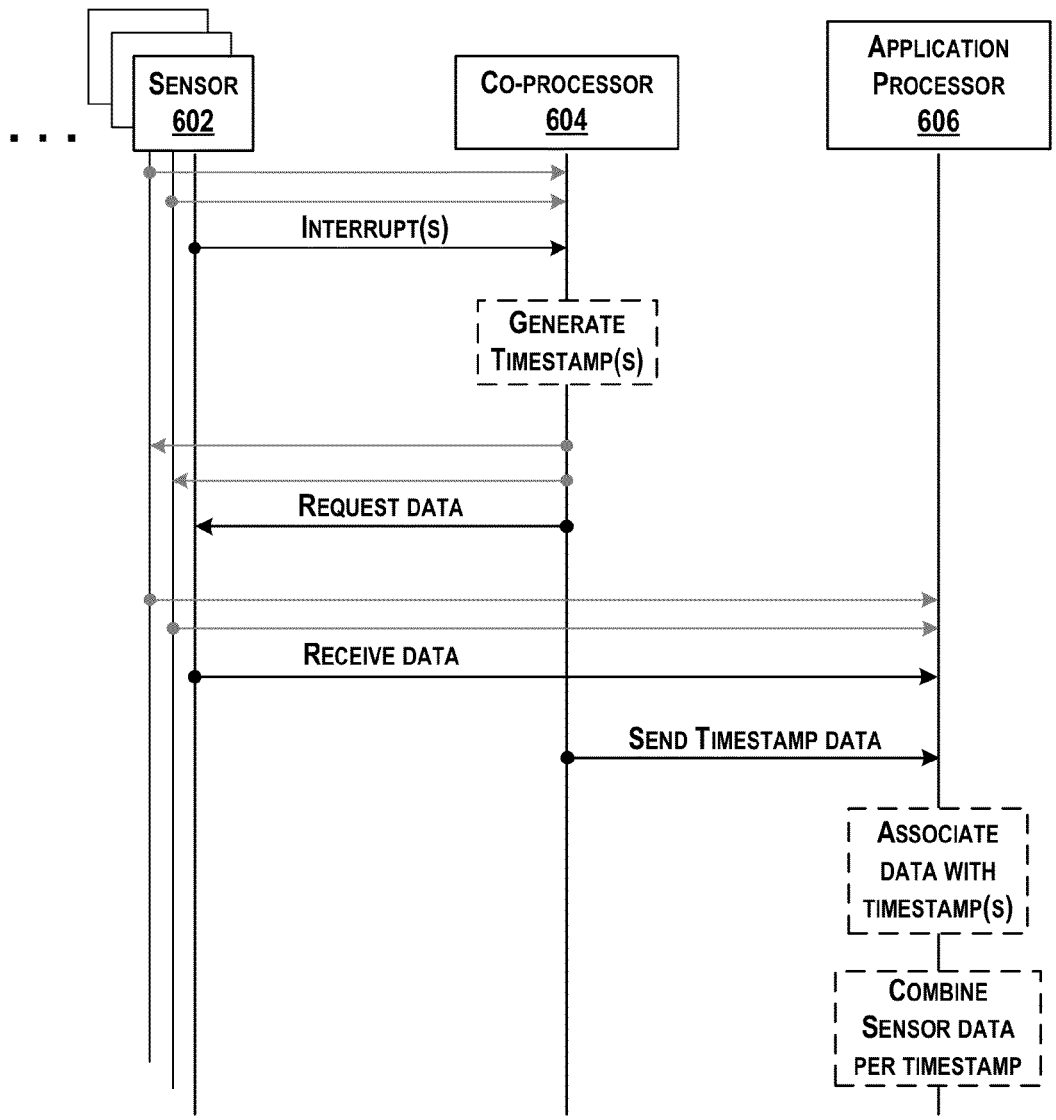
FIG. 6B is another example timing diagram conceptually illustrating synchronizing data received from multiple sensors of a device.

Turning now to FIGS. 6A and 6B, additional details regarding example techniques for determining timing information are described. FIG. 6A is an example timing diagram conceptually illustrating synchronizing data received from multiple sensors of a device. As shown, a sensor 602 may provide an interrupt to a co-processor 604, at which time the co-processor 604 will generate a timestamp. A number of sensors may provide interrupts to the co-processor 604 simultaneously or at various intervals, and upon receipt of an interrupt, the co-processor 604 will generate an associated timestamp. The co-processor 604 may then request the data from the sensor 602 corresponding to the interrupt, and subsequently receive the data from the sensor 602. In other examples, the co-processor 604 may not need to request the data from the sensor 602 as the sensor 602 will provide the data after providing an interrupt. Upon receipt of the sensor data, the co-processor may associate the timestamp with the respective data by matching interrupt timestamps to corresponding sensor data, and then combine sensor data per timestamp into a single data structure per timestamp. The co-processor 604 may subsequently provide the data structures to an application processor 606 in sequence.

FIG. 6B is another example timing diagram conceptually illustrating synchronizing data received from multiple sensors of a device. In FIG. 6B, the sensor 602 may provide an interrupt to the co-processor 604, at which time the co-processor 604 will generate a timestamp. A number of sensors may provide interrupts to the co-processor 604 simultaneously or at various intervals, and upon receipt of an interrupt, the co-processor 604 will generate an associated timestamp. The co-processor 604 may then request the data from the sensor 602 corresponding to the interrupt, and subsequently the sensor 602 may forward the data to the application processor 608. The co-processor 604 may then send the timestamp data to the application processor 608. Upon receipt of the data, the application processor 608 may associate the timestamp with the respective data by matching interrupt timestamps to corresponding sensor data, and then combine sensor data per timestamp into a single data structure per timestamp.

With reference to FIGS. 7-10, various examples of types of image data and sensor data that may be compared are described. FIGS. 7-10 conceptually illustrate example flow charts for cross-validating sensor data.

Figure 7:
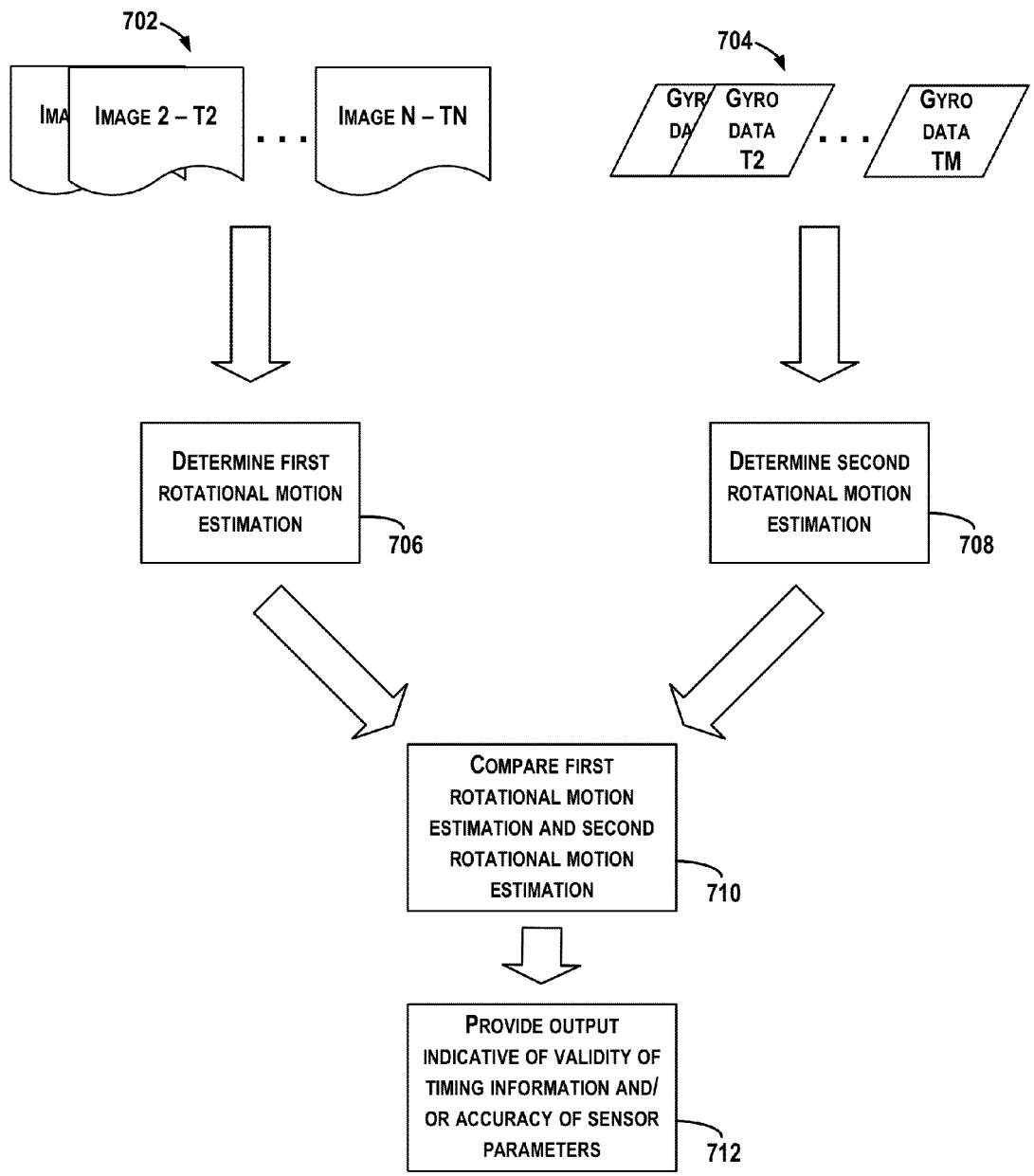
FIGS. 7-10 are conceptual illustrations of examples of cross-validating sensor data.

As shown in FIG. 7, information derived from image data 702 may be compared with information derived from gyroscope data 704. In one instance, the image data 702 may include a sequence of a number n images and associated timing information. The gyroscope data 704 may include a sequence of a number m rotational measurements, such as angular velocity measurements with respect to one or more axes, for example. The number m may be greater than, less than, or equal to n. The gyroscope data 704 may also include associated timing information.

At block 706, a first rotational motion estimation may be determined based on the image data 702. For example, a rotational motion estimation of the rotation of the mobile device over time may be determined by identifying one or more features in the image data 702, and tracking the location of the one or more features throughout the image data. Example features may include corners, edges, blobs, or other image features objectively identifiable using image processing techniques.

At block 708, a second rotational motion estimation may be determined based on the gyroscope data 704. By way of example, the second rotational motion estimation may be an estimate of the rotation of the mobile device over time. Such an estimate may be determined by integrating the gyroscope data 704 over time, for example.

At block 710, the first rotational motion estimation may be compared to the second rotational motion estimation. In one example, the magnitude of the first rotational motion estimation may be correlated with the magnitude of the second rotational motion estimation in order to determine a time-offset. In another example, the first rotational motion estimation and the second rotational motion estimation may each include rotation vectors that vary over time. The rotation vectors may be compared within a common reference frame to detect whether the directions of the rotation vectors align, within a threshold amount of variance of 2 degrees, for example.

And at block 712, an output may be provided based on the comparison performed at block 710. In one instance, if a determined time-offset is greater than a threshold amount of time, the output may indicate that the timing information associated with the image data 702 and the gyroscope data 704 is invalid. In another instance, if the rotation vectors corresponding to the image data 702 and the gyroscope data 704 do not align within a threshold amount of variance, the output may indicate that the timing information associated with the image data 702 and the gyroscope data 704 is invalid.

In another instance, the output may indicate an accuracy of sensor parameters, such as intrinsic or extrinsic parameters of a camera used to capture the image data 702 or a gyroscope that outputs the gyroscope data 704. The image data 702 and the gyroscope data 704 may be cross-validated in several ways to determine if an error exists in the intrinsic calibration or the extrinsic calibration in several ways. By way of example, rotation estimates determined using the image data 702 and the gyroscope data 704 may be compared. If the estimate derived from the image data 702 and the estimate derived from the gyroscope data 704 agree on the magnitude of the rotation (one degree of freedom), but not on the full rotation vector (three degrees of freedom), the output may indicate that that both the intrinsic parameters of the camera and the intrinsic parameters of the gyroscope are correct, but the extrinsic calibration (frame transformation) between them is incorrect. On the other hand, if the rotation estimates disagree on the magnitude of rotation, then the output may indicate that one or both of the camera and the gyroscope has incorrect intrinsic parameters.

Furthermore, the rotation estimates may be isolated around different axes of the gyroscope (e.g., first x-axis, then y-axis, then z-axis) to determine if the gyroscope intrinsic parameters are incorrect. If the gyroscope has a scale parameter error, for example, then the error between the rotation estimates will differ with respect to the different axes of the gyroscope. Thus, if the error between the rotation estimates differs with respect to the different axes (e.g., the error with respect to the x-axis is greater than a threshold, but the error with respect to the y-axis and z-axis is less than a threshold), the output may indicate that the intrinsic parameters of the gyroscope are incorrect.

Figure 8:
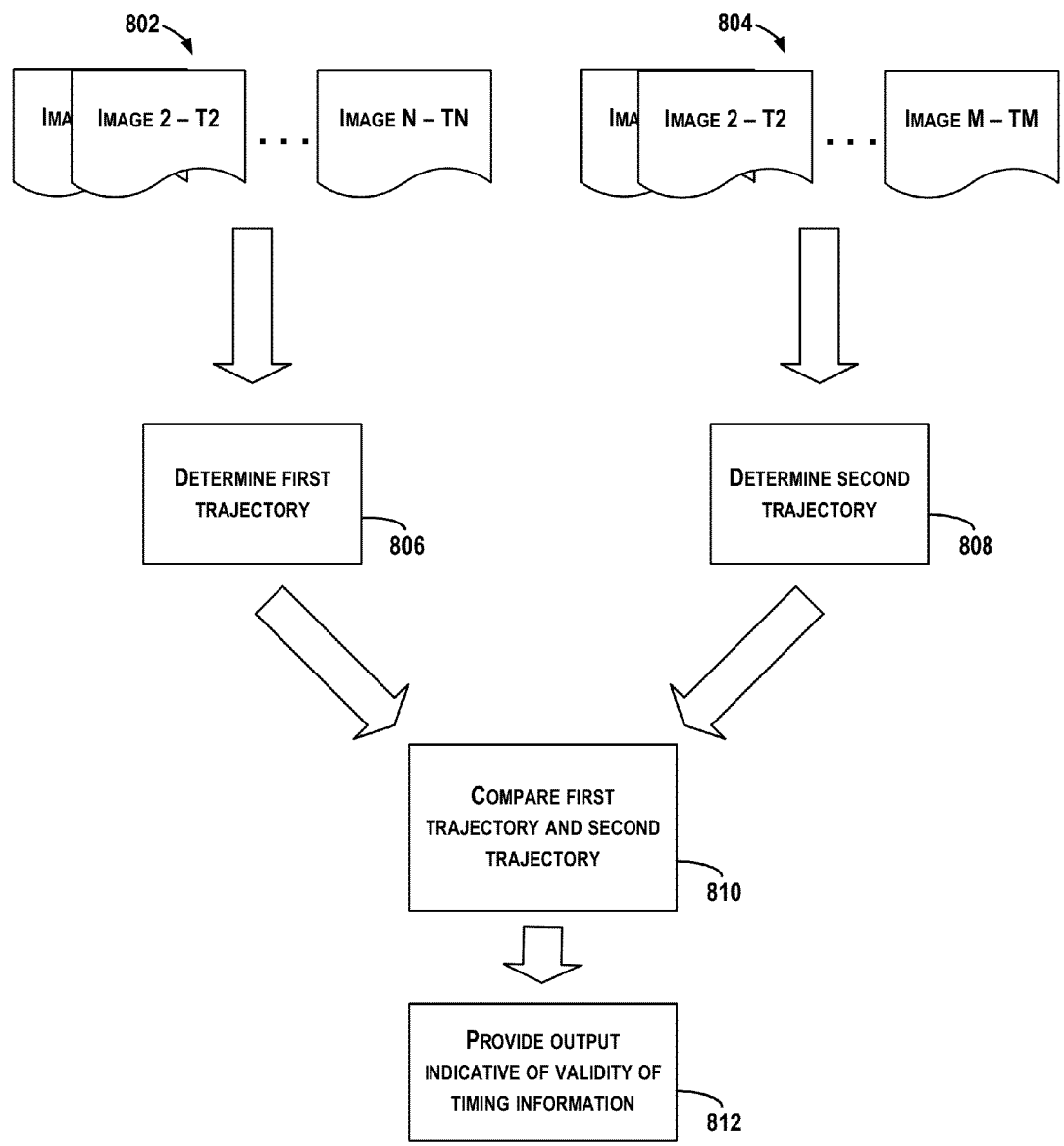

As shown in FIG. 8, in another example, information derived from first image data 802 may be compared with information derived from second image data 804. As one example, the first image data 802 may include a sequence of two-dimensional images captured using a first camera of the mobile device and the second image data 804 may include a second sequence of images captured using a second camera of the mobile device. In another example, the first image data 802 may include a sequence of two-dimensional images and the second image data 804 may include a sequence of three-dimensional images (e.g., depth images). Additionally, timing information may be associated with the first image data 802 and the second image data 804

At block 806, a first trajectory may then be determined based on the first image data 802. And at block 808, a second trajectory may be determined based on the second image data 804. For example, the first trajectory and second trajectory may include a position of the mobile device over time, an orientation of the mobile device over time, or a pose of the mobile device (i.e. both a position and an orientation of the mobile device) over time. In some instances, the position of the mobile device may be an absolute position within a frame of reference. In other instances, the position of the mobile device may be a relative position that is defined with respect to one or more axes of the frame of reference.

In one example, the first trajectory and the second trajectory may be determined using the DLS method described above. In such an example, the first trajectory and second trajectory are expressed in the same frame of reference. In other examples, other computer vision methods for solving for position, orientation, or pose of a mobile device based on a sequence of images may be employed. For instance, if the image data includes a sequence of depth images, a trajectory of the mobile device may be determined by extracting a plane from the sequence of images (such as a ground plane, wall, or ceiling), and computing a distance to the extracted plane for each image of the sequence of images.

At block 810, the first trajectory and the second trajectory may be compared. The comparison at block 810 may involve determining whether the distance between the first trajectory and the second trajectory changes over time by more than a threshold amount of variance. For instance, at time 1, the first trajectory may indicate that the mobile device is at position (x1,y1,z1) and the second trajectory may indicate that the mobile device is at position (x2,y2,z2), which is 3 cm away from (x1,y1,z1). At time 2, the first trajectory may indicate that the mobile device is at position (x3,y3,z3) and the second trajectory may indicate that the mobile device is at position (x4,y4,z4), which is 10 cm away from (x3,y3,z3). If the threshold amount of variance is 1 cm, the comparison may indicate that the first trajectory and the second trajectory differ by more than the threshold amount of variance. On the other hand, if position (x3,y3,z3) is only 3.5 cm away from position (x4,y4,z4), the variance would not be more than the threshold amount of variance.

In another instance, rather than comparing the distance between estimated positions of the mobile device over time, changes in one or more of the x-direction, y-direction, and z-direction respectively, as indicated by the first trajectory and the second trajectory, may be correlated to determine a time-offset between the changes in each respective direction. For instance, a time-offset between changes in the x-direction as indicated by the first trajectory and changes in the x-direction as indicated by the second trajectory may be computed. The time-offset may then be compared to a time-offset threshold. As another example, a first trajectory may indicate an estimated distance to a ground plane and a second trajectory may indicate an estimate of a three-dimensional position of the mobile device. If the motion of the mobile device is limited to only motion in a direction normal to the ground plane, the first trajectory may then be considered a y-position of the mobile device. Changes in the y-position indicated by the first trajectory may then be compared to changes in the y-position indicated by the second trajectory to determine whether the changes agree over time.

In still another instance, the comparison at block 810 may involve determining whether estimates of the orientations of the mobile device, as indicated by a first trajectory and a second trajectory, agree over time.

At block 812, an output may be provided based on the comparison at block 810. The output may be indicative of a validity of the timing information associated with the first image data 802 and the second image data 804. For instance, if the comparison at block 810 indicates that the distances between the first trajectory and the second trajectory do not vary with respect to each other by more than a threshold amount of variance, the output may indicate that the timing information is valid. As another example, if the comparison at block 810 indicates that the time-offset between changes in the y-direction indicated by the first trajectory and changes in the y-direction indicated by the second trajectory is greater than a threshold amount of time, the output may indicate that the timing information is invalid.

Figure 9:
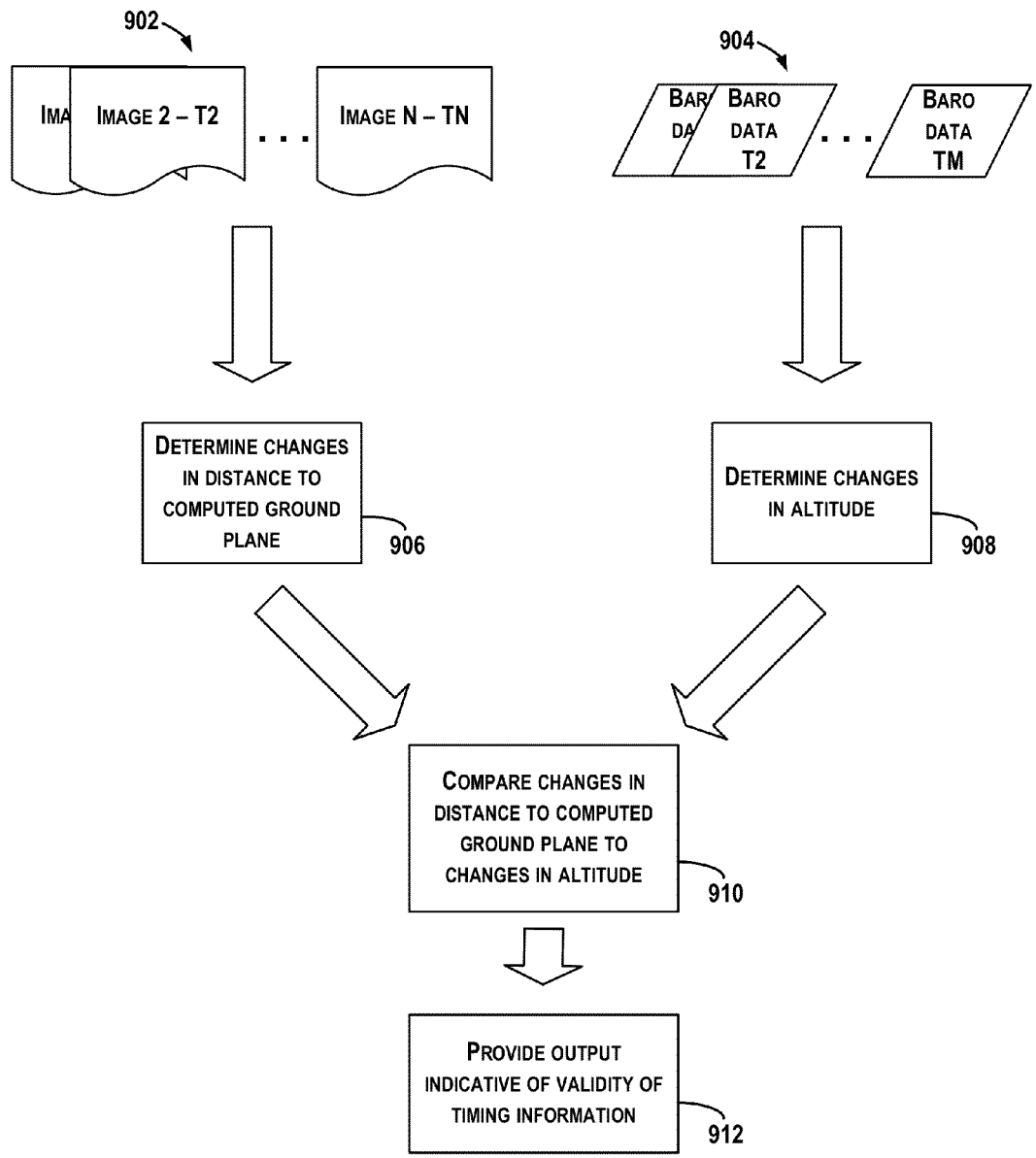

As shown in FIG. 9, in another example, information derived from image data 902 may be compared with information derived from barometer data 904. In one example, the image data 902 may include a sequence of depth images. For example, the image data 902 may include a sequence of depth images captured while the mobile device is pointed towards the ground and the position of the mobile device is varied in the vertical direction. The barometer data 904 may include a series of barometer readings, such as a series of pressure values. Additionally, timing information may be associated with the image data 902 and the barometer data 904.

At block 906, a distance to a ground plane over time may be determined. For example, a ground plane may be extracted from the images, and for each image, a distance to the ground plane may be determined. Additionally, interpolation may be used to estimate a distance to the ground plane at additional points in time.

At block 908, the barometer data 904 may be collected to determine an altitude or relative height of the mobile device over time. In some instances, interpolation may be used to estimate additional pressure values.

At block 910, the distances to the ground plane derived from the image data 902 may be compared to the altitudes derived from the barometer data 904. By way of example, a derivative of the distances to the ground plane over time may be correlated with a derivative of the altitude over time, and a time-offset may be calculated. The time-offset may be indicative of whether the changes in height derived from the image data 902 occur near the same time as the changes in height derived from the barometer data 904.

At block 912, an output that is indicative of a validity of the timing information associated with the image data 902 and the barometer data 904 may be provided. The output may indicate whether the changes in height derived from the image data 902 align in time with the changes in height derived from the barometer data 904. For instance, if the changes in height align in time, within a threshold amount of variance, the output may indicate that the timing information is valid.

Figure 10:
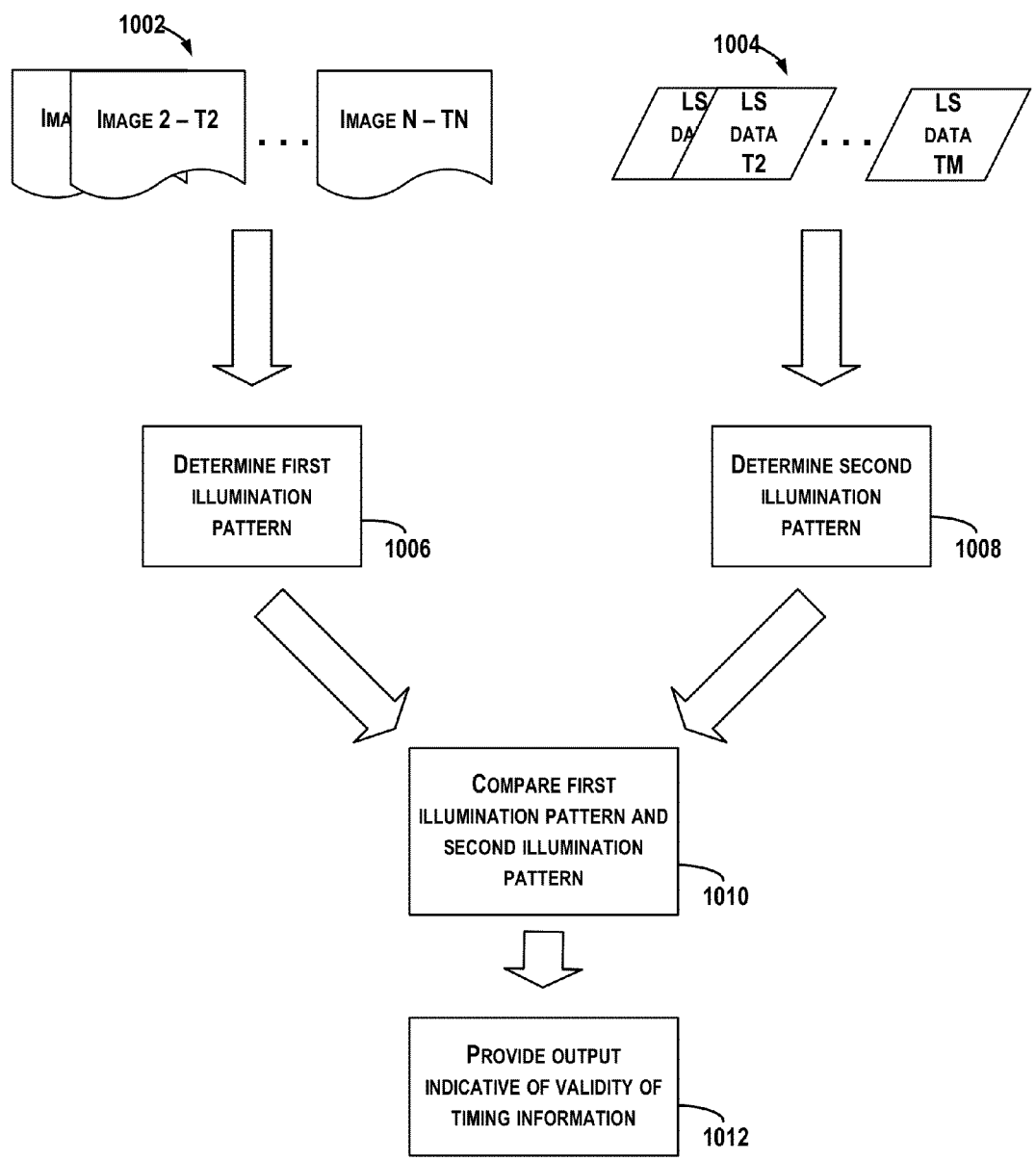

As shown in FIG. 10, in another example, information derived from image data 1002 may be compared with information derived from light sensor data 1004. In one instance, the image data 1002 may include a sequence of two-dimensional images, and the light sensor data 1004 may include a sequence of ambient light measurements. Additionally, timing information may be associated with the image data 1002 and light sensor data 1004.

At block 1006, a first illumination pattern may be determined based on the image data 1002. At block 1008, a second illumination pattern may be determined based on the light sensor data 1004. Each illumination pattern may indicate changes in brightness over time. For example, the first image data 1002 and the light sensor data 1004 may have been captured while the mobile device (or a separate device) produced a pattern of flashes.

At block 1010, the first illumination pattern may be compared to the second illumination pattern. In one example, a derivate of the first illumination pattern may be correlated with a derivative of the second illumination pattern to determine whether the first illumination pattern and the second illumination pattern align in time within a threshold amount of variance.

And then at block 1012, an output may be provided based on the comparison between the first illumination pattern and the second illumination pattern. The output may be indicative of the validity of the timing information. For example, if a time-offset between the first illumination pattern and the second illumination pattern is greater than a threshold amount of time, the output may indicate that the timing information is invalid.

In some embodiments, image data and sensor data for one or more sensors of the mobile device may be received together in a digital image format. For example, a co-processor of the mobile device may receive the image data and the sensor data, and generate a digital image that includes the image data and the sensor data. The sensor data may be embedded within pixels of the digital image. For instance, the co-processor may be configured to represent the sensor data as fake pixels in the digital image (i.e., pixels whose values have been defined by a processor to represent a portion of a sensor value).

By way of example, the digital image may include pixels that are defined in a brightness and chrominance (YUV) color space. A 16-bit raw sensor value can then be embedded in a "Y" space of two pixels. For instance, eight bits of the 16-bit raw sensor value can be represented in a "Y" space of a first pixel and the remaining eight bits can be embedded in a "Y" space of a second pixel. Values in the "U" space and the "V" space of the pixels can be set to zero in order to ensure that the sensor value is not skewed during image compression or packing, for example.

As another example, a 32-bit single-precision floating point number can be represented in the "Y" space of four separate 8-bit pixels, while values in the "U" space and the "Y" space can be set to zero. Other examples are also possible depending on the number of bytes per pixel and/or color space utilized by the digital image. For instance, the sensor data may be embedded in the "U" space or "V" space instead of the "Y" space. Thus, the examples are not meant to be limiting.

FIG. 11 is a conceptual illustration of an example digital image format. The conceptual illustration 1100 is shown for purposes of example only, and is not meant to be limiting in any manner. Other configurations and formats for the digital image are also contemplated.

As shown in FIG. 11, the example digital image format includes sensor data 1102, computer-vision data 1104, first camera data 1106, depth data 1108, and second camera data 1110. The sensor data 1102 is shown within the first sixteen rows of a digital image. Thereafter, in the next few rows, the computer-vision data 1104 is provided. Consequently, in an example in which the digital image is provided to the application processor row by row, the sensor data 1102 would first be provided, followed by the computer-vision data 1104.

The computer-vision data 1104 may include image features determined using a two-dimensional image and/or image features determined using depth data. Below the sensor data 1102 and computer-vision data 1104, which are shown as occupying 31 rows in the example digital image format 1100, larger data sources are provided. The larger data sources include the first camera data 1106, followed by the depth data 1108, and the second camera data 1110. In one example, the first camera data 1106 may be an image from a first camera having a field of view that is greater than 120 degrees, such as the GS camera 208 of FIG. 2. Further, the second camera data may be an image from a second camera having a smaller field of view, such as the RS camera 210 of FIG. 2.

Note that the example digital image format shown in FIG. 11 is just one example. In other instances, other digital image formats may be utilized. For instance, the first camera data 1106 and the second camera data 1110 may be located side-by-side within rows 31-510 of a digital image (not shown). Similarly, in other example digital image formats, more or less data may be provided. For instance, in another digital image format the depth data or the computer-vision data may be omitted, or third camera data from a third camera may also be included. As another example, in another digital image format, a combined color and depth image may be provided in addition to or in place of the first camera data 1106, the depth data 1108, and/or second camera data 1110.

In another example digital image format, the digital image may include padding between one or more of the different data segments. For example, the digital image may be padded with blank or empty data in between the first camera data 1106 and the depth data 1108 or between the depth data 1108 and the second camera data 1110. In some instances, the padding between the different data segments may be inserted in order to make sure that the beginning of each data segment corresponds to the beginning of a sector or subdivision of a track in a memory.

As an example, padding may be inserted between data segments to make sure that the beginning of the first camera data 1106 corresponds to the beginning of a 4096-byte (4K) sector. This may allow the first camera data 1106 to be written more efficiently to memory. Similarly, the digital image may be padded such that the beginning of each of the depth data 1108 and second camera data 1110 corresponds to the beginning of a 4K sector.

In another example digital image format, the width of the digital image may be 1280 pixels. As a result, each row of the digital may include two rows of pixel data from the first camera data. The rows may be organized side-by-side. For example, columns 0-639 of row 31 of the digital image may include a first row of pixels of the first camera data 1106 and columns 640-1279 or row 31 may include a second row of pixels of the first camera data 1106. Similarly, a single row of the digital image may include 4 rows of depth data 1108 or two rows of pixels of second camera data 1110.

In some instances, frame numbers may also be include at the beginning and end of the digital frame and/or at the beginning or end of each data segment (not shown). The frame numbers may enable an application processor to confirm that data of a received digital image all corresponds to the same digital image, rather than a previously received digital image, for example.

In another example digital image format, the digital image may include encoded pixel information that identifies whether a particular segment of data is new or stale. For instance, if the depth data 1108 is captured at 5 Hz, the first camera data is captured at 30 Hz, and the digital image is generated at 30 Hz, it may be possible that depth data for a given digital image is the same depth data that was provided in a previous digital image. Accordingly, if the depth data 1108 is newly acquired, a flag may be set to indicate that the depth data 1108 is new. On the other hand, if the depth data 1108 is stale, the flag may not be set, indicating that the depth data 1108 is not new.

In FIG. 12, a conceptual illustration 1200 of example sensor data formats is provided. As shown in FIG. 12, accelerometer data is provided in a first line (e.g., a first row of pixels) of a digital image. In particular, the eight highest bits of a 16-bit x-axis acceleration value (i.e., a high byte) are shown within the "Y" space of a first pixel while the eight lowest bits of the 16-bit x-axis acceleration value (i.e., a low byte) are shown within the "Y" space of a second pixel. Similarly, y-axis acceleration values and z-axis acceleration values are shown in the "Y" space of pixels 2-3 and 4-5 respectively. Furthermore, gyroscope data and magnetometer data are also embedded within the "Y" space of pixels 0-5 of lines 1 and 2.

The barometer reading is shown as four separate bytes (B3, B2, B1, and B0) that, when combined, represent a 32-bit number. In line 4, an integer component of a temperature reading is shown in the "Y" space of pixels 0-1, while a fraction component of the temperature reading is shown in the "Y" space of pixels 2-3. Additionally, a timestamp that has been divided into four eight bit values is also shown in line 5. In other examples, the sensor data may also include timestamp data for one or more of the other sensors.

Although sensor data for each type of sensor is located within an individual row of pixels in FIG. 12, in other examples, the sensor data may be represented within a single row of pixels (not shown). For example, the gyroscope data may be embedded in the "Y" space of pixels 6-11, the magnetometer data may be represented in the "Y" space of pixels 12-17, and so forth.

FIG. 12 also illustrates example formats of computer-vision data. For example, a first four-byte image feature is embedded in the "Y" space of the first four pixels of line 16. Additionally, a second, two-byte, image feature is embedded in the "Y" space of pixels 4-5. Other configurations are also contemplated.

In some embodiments, the disclosed methods may be implemented as computer program instructions encoded on a non-transitory computer-readable storage media in a machine-readable format, or on other non-transitory media or articles of manufacture. FIG. 13 is a schematic illustrating a conceptual partial view of an example computer program product 300 that includes a computer program for executing a computer process on a computing device, arranged according to at least some embodiments presented herein.

In one embodiment, the example computer program product 1300 is provided using a signal bearing medium 1301. The signal bearing medium 1301 may include one or more programming instructions 1302 that, when executed by one or more processors may provide functionality or portions of the functionality described above with respect to FIGS. 1-12. In some examples, the signal bearing medium 1301 may encompass a computer-readable medium 1303, such as, but not limited to, a hard disk drive, a Compact Disc (CD), a Digital Video Disk (DVD), a digital tape, memory, etc. In some implementations, the signal bearing medium 1301 may encompass a computer recordable medium 1304, such as, but not limited to, memory, read/write (R/W) CDs, R/W DVDs, etc. In some implementations, the signal bearing medium 1301 may encompass a communications medium 1306, such as, but not limited to, a digital and/or an analog communication medium (e.g., a fiber optic cable, a waveguide, a wired communications link, a wireless communication link, etc.). Thus, for example, the signal bearing medium 1301 may be conveyed by a wireless form of the communications medium 1306 (e.g., a wireless communications medium conforming to the IEEE 802.11 standard or other transmission protocol).

The one or more programming instructions 1302 may be, for example, computer executable and/or logic implemented instructions. In some examples, a computing device such as the computing device 100 of FIG. 1 may be configured to provide various operations, functions, or actions in response to the programming instructions 1302 conveyed to the computing device 100 by one or more of the computer-readable medium 1303, the computer recordable medium 1304, and/or the communications medium 1306.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method performed by a mobile device having a plurality of sensors, the method comprising:
   receiving image data and first timing information associated with the image data, wherein the image data includes images representative of a motion of the mobile device and is determined using a first sensor of the plurality of sensors;
   receiving sensor data and second timing information associated with the sensor data, wherein the sensor data corresponds to the motion of the mobile device and is determined using a second sensor of the plurality of sensors;
   determining a first estimation of the motion of the mobile device based on the image data and the first timing information;
   determining a second estimation of the motion of the mobile device based on the sensor data and the second timing information;
   determining whether the first estimation of the motion of the mobile device is within a threshold variance of the second estimation of the motion of the mobile device; and
   based on whether the first estimation of the motion of the mobile device is within the threshold variance of the second estimation of the motion of the mobile device, providing an output indicative of a validity of the first timing information and the second timing information.

2. The method of claim 1 carried out by an application processor of the mobile device, wherein the first timing information and the second timing information are received from a co-processor of the mobile device that is configured to determine the first timing information and the second timing information.

3. The method of claim 2, further comprising receiving, by the application processor and from the co-processor, a digital image that includes the image data and the sensor data, wherein the sensor data is embedded in pixels of the digital image.

4. The method of claim 2, further comprising receiving, by the application processor and from the first sensor, the image data.

5. The method of claim 1:
   wherein the image data comprises a sequence of two-dimensional images, and
   wherein determining the first estimation of the motion of the mobile device based on the image data and the first timing information comprises determining a first rotational motion of the mobile device based on movement of image features between images of the sequence of two-dimensional images.

6. The method of claim 5:
   wherein the second sensor comprises a gyroscope, and
   wherein determining the second estimation of the motion of the mobile device based on the sensor data and the second timing information comprises determining a second rotational motion of the mobile device.

7. The method of claim 1:
   wherein the image data comprises a sequence of two-dimensional images of known three-dimensional points in a scene, and
   wherein determining the first estimation of the motion of the mobile device based on the image data and the first timing information comprises determining a trajectory of the mobile device based on locations of the known three-dimensional points in the sequence of two-dimensional images.

8. The method of claim 7:
   wherein the sensor data comprises another sequence of two-dimensional images of the known three-dimensional points in the scene, and
   wherein determining the second estimation of the motion of the mobile device based on the sensor data and the second timing information comprises determining another trajectory of the mobile device based on locations of the known-three dimensional points in the other sequence of two-dimensional images.

9. The method of claim 7:
   wherein the sensor data comprises a sequence of depth images, and
   wherein determining the second estimation of the motion of the mobile device based on the sensor data and the second timing information comprises determining another trajectory of the mobile device based on a depth to a computed plane extracted from the sequence of depth images.

10. The method of claim 1:
wherein the image data comprises a sequence of depth images, and
wherein determining the first estimation of the motion of the mobile device based on the image data and the first timing information comprises determining a distance to a computed ground plane extracted from the sequence of depth images.

11. The method of claim 10, wherein the second sensor comprises a barometer.

12. The method of claim 1, wherein the second sensor comprises a light sensor, and wherein the method further comprises:
determining a first estimation of an illumination pattern based on the image data and the first timing information;
determining a second estimation of an illumination pattern based on the sensor data and the second timing information,
wherein the output is further based on whether the first estimation of the illumination pattern is within another threshold variance of the second estimation of the illumination pattern.

13. The method of claim 1, further comprising providing another output indicative of an accuracy of parameters of the first sensor or the second sensor based on whether the first estimation of the motion of the mobile device is within the threshold variance of the second estimation of the motion of the mobile device.

14. The method of claim 1, further comprising:
receiving additional sensor data and third timing information associated with the additional sensor data, wherein the additional sensor data corresponds to the motion of the mobile device and is determined using a third sensor of the plurality of sensors;
determining a third estimation of the motion of the mobile device based on the additional sensor data and the third timing information;
determining whether the first estimation of the motion of the mobile device is within another threshold variance of the third estimation of the motion of the mobile device; and
wherein the output indicative of the validity of the first timing information and the second timing information is further based on whether the first estimation of the motion of the mobile device is within the other threshold variance of the third estimation of the motion of the mobile device.

15. A mobile device comprising:
at least one camera;
at least one sensor; and
a processor, the processor configured to:
receive image data and first timing information associated with the image data, wherein the image data includes images representative of a motion of the mobile device and is determined using the at least one camera,
receive sensor data and second timing information associated with the sensor data, wherein the sensor data corresponds to the motion of the mobile device and is determined using the at least one sensor,
determine a first estimation of the motion of the mobile device based on the image data and the first timing information,
determine a second estimation of the motion of the mobile device based on the sensor data and the second timing information,
determine whether the first estimation of the motion of the mobile device is within a threshold variance of the second estimation of the motion of the mobile device, and
based on whether the first estimation of the motion of the mobile device is within the threshold variance of the second estimation of the motion of the mobile device, provide an output indicative of a validity of the first timing information and the second timing information.

16. The mobile device of claim 15:
wherein the image data comprises a sequence of two-dimensional images, and
wherein determining the first estimation of the motion of the mobile device based on the image data and the first timing information comprises determining a first rotational motion of the mobile device based on movement of image features between images of the sequence of two-dimensional images.

17. The mobile device of claim 16, wherein the processor is further configured to provide another output indicative of an accuracy of parameters of the first sensor or the second sensor based on whether the first estimation of the motion of the mobile device is within the threshold variance of the second estimation of the motion of the mobile device.

18. A non-transitory computer readable medium configured to store instructions that, when executed by one or more processors, cause the one or more processors to perform functions comprising:
receiving image data and first timing information associated with the image data, wherein the image data includes images representative of a motion of a mobile device and is determined using a first sensor of a plurality of sensors of the mobile device;
receiving sensor data and second timing information associated with the sensor data, wherein the sensor data corresponds to the motion of the mobile device and is determined using a second sensor of the plurality of sensors;
determining a first estimation of the motion of the mobile device based on the image data and the first timing information;
determining a second estimation of the motion of the mobile device based on the sensor data and the second timing information;
determining whether the first estimation of the motion of the mobile device is within a threshold variance of the second estimation of the motion of the mobile device; and
based on whether the first estimation of the motion of the mobile device is within the threshold variance of the second estimation of the motion of the mobile device, providing an output indicative of a validity of the first timing information and the second timing information.

19. The non-transitory computer readable medium of claim 18:
wherein the image data comprises a sequence of two-dimensional images, and
wherein determining the first estimation of the motion of the mobile device based on the image data and the first timing information comprises determining a first rotational motion of the mobile device based on movement of image features between images of the sequence of two-dimensional images.

20. The non-transitory computer readable medium of claim 18:
   wherein the image data comprises a sequence of depth images, and
   wherein determining the first estimation of the motion of the mobile device based on the image data and the first timing information comprises determining a distance to a computed ground plane extracted from the sequence of depth images.

* * * * *